Oct. 31, 1939.   V. J. FRANCIS   2,177,703
ELECTRIC GASEOUS DISCHARGE DEVICE
Filed Nov. 26, 1937
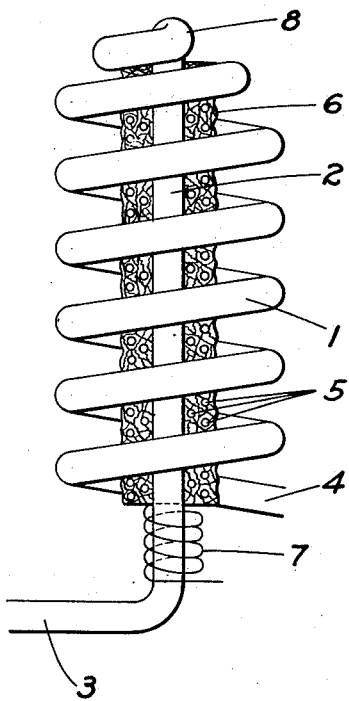
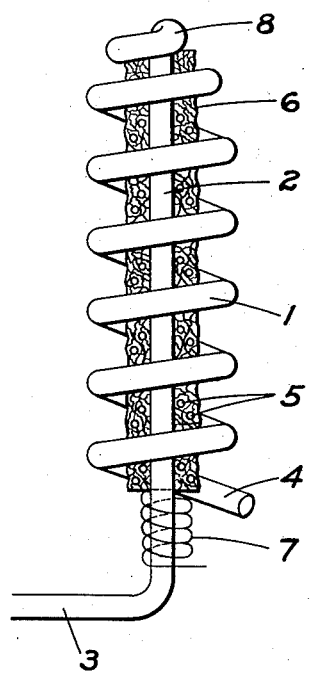
INVENTOR
Victor James Francis
BY *Harry E. Dunham*
ATTORNEY Patented Oct. 31, 1939

2,177,703

UNITED STATES PATENT OFFICE 2,177,703

ELECTRIC GASEOUS DISCHARGE DEVICE

Victor J. Francis, Middlesex, England, assignor to General Electric Company, a corporation of New York Application November 26, 1937, Serial No. 176,499 In Great Britain November 25, 1936

2 Claims. (Cl. 176—126)

(Granted under the provisions of sec. 14, act of March 2, 1927; 357 O. G. 5)

The present invention relates to electric gaseous discharge devices, and particularly to thermionic cathodes for use therein.

A particular object of the invention is to provide a thermionic cathode which will have a long useful life when used in an electric gaseous discharge device. A further object of the invention is to provide a cathode which can be easily degassed during the manufacture thereof. Still other objects and advantages of the invention will appear from the following detailed specification or from an inspection of the accompanying drawing, or both.

The invention consists in the new and novel combination of elements hereinafter set forth and claimed.

In the production of thermionic cathodes of the discharge heated type for use in electric gaseous discharge devices, such as the well known high pressure mercury vapor arc lamps, it has been found desirable to provide a relatively large reserve supply of the material with which the electrode surface is activated. Where such a large quantity of active material has been used, however, it has been found that these electrodes have been relatively difficult to degas and activate during manufacture. Furthermore the rate of loss of the active material through sputtering and evaporation during use of the device has materially limited the useful life of these cathodes.

I have now discovered that a novel cathode of my invention eliminates both of these problems, since it is readily degassed and activated by inductive heating and likewise operates with an extremely low loss of active material, so that it has an unusually long useful life.

According to my invention this novel thermionic cathode comprises an outer helix uncoated with thermionically active material, except for what is sputtered thereon during operation, a lead to one end of the said helix passing along the interior of the helix and a porous metal body whose pores are partially or wholly filled with thermionically active material between the said helix and the said lead, the said body being in contact with the said lead.

The said porous body may be wire gauze, preferably in several layers, or it may be one or several coaxial helices; its function is to provide path of high electrical and thermal conductivity through the active material. The metal of the helix and of the porous body is preferably tungsten; but both bodies need not be of the same metal. The helix may be shorter than the porous body so that, although the whole porous body surrounds the said interior lead, not all of it is surrounded by the helix.

It has been found that cathodes according to the invention are easily degassed and activated by inductively heating them in a high frequency field after they have been sealed into the envelope of the discharge device in which they are to be used, especially where the envelope is of quartz, in which case the electrodes are preferably sealed into the envelope in a vacuum, and a preliminary degassing is ordinarily effected by heating the envelope. As a result only a single lead to the electrode is required. The discharge current is received on the outer helix which is thus heated, and this in turn heats the outer surface of the porous body; the inner surface of the body is heated both by the current flowing through the interior lead and by heat conducted from the outer helix. The outer helix serves also to hinder sputtering and evaporation from the active body during operation, thus increasing the useful life of the cathode. In case the envelope is of glass and the electrodes are sealed into it in inert gas, care is taken not to oxidize the electrode during the process. With this construction, moreover, it has been found desirable in some cases to provide a second lead to the spiral, so that current can be passed through it for degassing and activation, although no current is passed through it in operation.

Preferably the electrodes are adapted to be used in an axial position; that is to say so that the axis of the electrode is substantially parallel to and coincident with the axis of the discharge. Then a further advantage of electrodes according to the invention is that the position of the active material, relative to that part of the electrode on which the discharge plays in the fully operating condition, can be accurately and uniformly adjusted.

For the purpose of illustrating my invention I have shown two embodiments thereof in the accompanying drawing, in which Fig. 1 is a view of a cathode constructed according to my invention, and Fig. 2 is a view of a modification of the cathode of Fig. 1.

The cathode of Fig. 1 is especially adapted to be used in a 250 watt lamp, with an arc length of 12 cms. and a glass envelope 29 mm. in diameter operating with 130 volts across the lamp.

In the drawing 1 is an outer coil, consisting of tungsten wire 0.4 mm. in diameter wound into a helix of 150% pitch, and 3 mm. internal diameter; the wire is continued at one end so as to form the straight lead 2 passing down the axis of the helix; this lead is bent again as shown at 3; this part 3 together with the other end of the spiral 4 is welded to leads (not shown) which pass through the envelope and support the cathode in the usual manner. The porous metal body consists of three tungsten wires 5, of diameters 0.15 mm., 0.25 mm. and 0.2 mm. respectively, wound into three coaxial helices of 150% pitch and internal diameters 0.5 mm., 0.75 mm. and 1.2 mm.; they are coated with the active material 6 by dipping the helices several times (to ensure a uniform distribution of material) into a solution of barium and strontium carbonates. The helices 5 are slipped over the straight wire 2 before the end 3 is bent; a gap of about 0.7 mm. is thereby left between the outer helix 1 and the active material 6. The helices 5 are held in position by the short wire helix 7 which abuts also against the bent portion 3.

The cathode is situated axially in the envelope as previously described and the discharge plays on the portion 8 in the fully operating condition.

The alternative embodiment shown in Fig. 2 is especially adapted to be used in a 125 watt lamp, with an arc length of 30 mm. and a quartz envelope 8 mm. in diameter operating with 120 volts across the lamp. In this embodiment the outer helix 1 is made of tungsten wire 0.3 mm. in diameter; it is of 2 mm. internal diameter and 150% pitch. There are two helices 5 made of wires of 0.15 mm. and 0.25 mm. respectively, wound so as to have internal diameters of 0.5 and 0.75 mm. respectively and 150% pitch. The construction is otherwise generally similar to that of the first embodiment; but, since the envelope in which this electrode is to be used is of quartz, the electrode can now be degassed and activated entirely by heating the quartz envelope and by subsequent heating, or so-called bombardment, of the electrode by a high frequency field. Accordingly, only one lead to the extension is provided, connected to the part 3; the end 4 of the helix is free.

While I have described my invention by reference to certain embodiments thereof, it is to be understood that it is not limited thereto, but that various changes, substitutions and omissions, within the scope of the appended claims, may be made therein without departing from the spirit of the invention.

What I claim as new and desire to secure by Letters Patent of the United States, is:

1. A thermionic cathode adapted for use within an electric gaseous discharge device, said cathode comprising a porous metal body whose pores are filled with thermionically active material, a helix of refractory metal surrounding said body, and a lead extending from one end of said helix through said body in good thermal contact therewith, said helix being spaced from said body.

2. A thermionic cathode adapted for use within an electric gaseous discharge device, said cathode comprising a porous metal body whose pores are filled with thermionically active material, said body consisting of a plurality of interlaced helices, a helix of refractory metal surrounding said body, and a lead extending from one end of said helix through said body in good thermal contact therewith, said helix being spaced from said body.

VICTOR J. FRANCIS.